(12) United States Patent
Wang

(10) Patent No.: US 9,954,695 B2
(45) Date of Patent: Apr. 24, 2018

(54) CHANNEL MEASUREMENT METHOD FOR LARGE-SCALE ANTENNAS, AND USER TERMINAL

(71) Applicant: Huawei Technologies Co., Ltd., Shenzhen (CN)

(72) Inventor: Lei Wang, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 72 days.

(21) Appl. No.: 15/004,595

(22) Filed: Jan. 22, 2016

(65) Prior Publication Data

US 2016/0142228 A1    May 19, 2016

Related U.S. Application Data

(63) Continuation of application No. PCT/CN2014/082734, filed on Jul. 22, 2014.

(30) Foreign Application Priority Data

Jul. 23, 2013  (CN) .......................... 2013 1 0312322

(51) Int. Cl.
*H04L 25/02* (2006.01)
*H04B 7/0417* (2017.01)
(Continued)

(52) U.S. Cl.
CPC ....... *H04L 25/0228* (2013.01); *H04B 7/0417* (2013.01); *H04B 7/0619* (2013.01); *H04L 5/0023* (2013.01); *H04L 5/0048* (2013.01); *H04L 25/0204* (2013.01); *H04L 25/0226* (2013.01); *H04L 27/26* (2013.01); *H04W 24/02* (2013.01)

(58) Field of Classification Search
CPC .... H04L 27/26; H04L 25/0228; H04B 7/0417
See application file for complete search history.

(56) References Cited

U.S. PATENT DOCUMENTS 7,139,320 B1 * 11/2006 Singh .................... H04L 5/0048
375/260
8,416,872 B2    4/2013 Higuchi et al.
(Continued)

FOREIGN PATENT DOCUMENTS

CN    1167416 A    12/1997
CN    1917498 A    2/2007
(Continued)

*Primary Examiner* — Jaison Joseph
(74) *Attorney, Agent, or Firm* — Leydig, Voit & Mayer, Ltd.

(57) ABSTRACT

Provided are a channel measurement method for large-scale antennas, and a user terminal. The method comprises: antennas at a base station side are divided into more than two groups in advance, a user terminal receives pilot signals transmitted from the antennas at the base station side, where the antennas in one group transmit the pilot signals in a frequency-division mode, and the antennas in different groups transmit the pilot signals in a time-division mode; and the user terminal performs a spatial channel estimation based on the pilot signals received from partial groups of the antennas, to obtain a channel measurement result for all the antennas.

11 Claims, 5 Drawing Sheets

(51) Int. Cl.
*H04B 7/06* (2006.01)
*H04L 27/26* (2006.01)
*H04L 5/00* (2006.01)
*H04W 24/02* (2009.01)

(56) References Cited

U.S. PATENT DOCUMENTS

| | | | |
|---|---|---|---|
| 2006/0209670 A1 | 9/2006 | Gorokhov et al. | |
| 2006/0209732 A1 | 9/2006 | Gorokhov et al. | |
| 2006/0209973 A1 | 9/2006 | Gorokhov et al. | |
| 2008/0063115 A1 | 3/2008 | Varadarajan et al. | |
| 2008/0253279 A1* | 10/2008 | Ma | H04B 7/0684 370/206 |
| 2011/0299623 A1 | 12/2011 | Wang et al. | |
| 2012/0177001 A1* | 7/2012 | Gao | H04B 7/0697 370/330 |
| 2012/0182964 A1* | 7/2012 | Gao | H04B 7/0697 370/330 |
| 2012/0307930 A1 | 12/2012 | Ma et al. | |
| 2013/0039386 A1 | 2/2013 | Zhou et al. | |
| 2015/0270996 A1 | 9/2015 | Ma et al. | |

FOREIGN PATENT DOCUMENTS

| | | |
|---|---|---|
| CN | 1972174 A | 5/2007 |
| CN | 1992690 A | 7/2007 |
| CN | 101207424 A | 6/2008 |
| CN | 101777945 A | 7/2010 |
| CN | 101778072 A | 7/2010 |
| CN | 101807976 A | 8/2010 |
| CN | 101854198 A | 10/2010 |
| CN | 101867533 A | 10/2010 |
| CN | 101882952 A | 11/2010 |
| CN | 102045143 A | 5/2011 |
| CN | 102098088 A | 6/2011 |
| CN | 102223167 A | 10/2011 |
| CN | 101227255 B | 8/2012 |
| CN | 103036844 A | 4/2013 |
| WO | WO 2008031037 A2 | 3/2008 |
| WO | WO 2009059735 A2 | 5/2009 |

* cited by examiner

CHANNEL MEASUREMENT METHOD FOR LARGE-SCALE ANTENNAS, AND USER TERMINAL

CROSS-REFERENCE TO RELATED APPLICATIONS

This application is a continuation of International Application No. PCT/CN2014/082734, filed on Jul. 22, 2014, which claims priority to Chinese Patent Application No. 201310312322.5, filed on Jul. 23, 2013, both of which are hereby incorporated by reference in their entireties.

FIELD OF THE TECHNOLOGY

The present application relates to the field of wireless communication technology, particularly to a channel measurement method for large-scale antennas and a user terminal thereof.

BACKGROUND

The main object of the next generation cellular communication system is to improve the system throughput, and MIMO (Multiple-Input-Multiple-Output, multiple-input-multiple-output) is an important technical solution to achieve the object in modern mobile communications. The technology of Large-scale antennas is further development of the MIMO technique, which improves the system throughput by deploying massive antennas at the base station side, as shown in FIG. 1.

In an MIMO system, the base station is required to transmit pilot signals to the whole cell at intervals, a UE (user equipment) in the cell performs the channel measurement through the pilot signals, which is used to calculate channel parameters such as CQI (channel status information) and to feed back the channel parameters to the base station. In the conventional MIMO technology, there are few transmitting antennas (generally no more than 8 antennas), thus each of the antennas transmits orthogonal pilot signals. However, in an MIMO system with large-scale antennas, with the increase of antennas, massive orthogonal pilot signals occupy a lot of time-frequency resources and reduce the actual system throughput. In view of this, the following method is provided in conventional technology.

The transmitting antennas are divided into multiple groups, the antennas in one transmit a same pilot signal, and the antennas in different groups transmit orthogonal pilot signals, i.e., the antennas in different groups transmit the pilot signals in a frequency-division mode. In the method, the same pilot signal is transmitted on the antennas in one group, which may save pilot overhead caused by multiple antennas, but the receiving end of the pilot signal cannot perform a complete channel measurement.

SUMMARY

In view of this, a channel measurement method for large-scale antennas and a user terminal thereof are provided in the present disclosure, to reduce pilot overhead and achieve integrity of channel measurement.

The technical solution is as follows.

In a first aspect, a channel measurement method for large-scale antennas is provided, where antennas at a base station side are divided into more than two groups in advance. The channel measurement method includes:

receiving, by a user terminal, pilot signals transmitted from different antennas in one at the base station side in a frequency-division mode and transmitted from antennas in different groups at the base station side in a time-division mode; and performing a spatial channel estimation based on the pilot signals received from partial groups of antennas, to obtain a channel measurement result for all the antennas.

In a first possible implementation in the first aspect, the time-frequency resources each time occupied by each of the antennas in a sub-frame assigned to transmit the pilot signals are variable.

In a second possible implementation in the first aspect, performing the spatial channel estimation based on the pilot signals received from partial groups of antennas, to obtain the channel measurement result for all the antennas, includes:

wherein pilot signals y received by a mobile terminal from the partial groups of antennas is $y=(y_1, y_2, \ldots, y_K)^T$, and pilot signals x transmitted by the partial groups of antennas at the base station side is $x=(x_1, x_2, \ldots, x_K)^T$, where K is the number of the antennas included in the partial groups of antennas;

based on an equation $\hat{H}=C'_H(C''_H+\sigma^2 \text{diag}(1/|x_1|^2, \ldots, 1/|x_K|^2))^{-1}y$, obtaining a channel estimation value $\hat{H}$ for all the antennas, where $\hat{H}=(h_1, h_2, \ldots, h_M)^T$, M is the number of all the antennas, σ is noise power of a receiver in the user terminal, $C'_H$ is column K in $C_H$ corresponding to positions of the pilot signals received by the mobile terminal, $C''_H$ cliff is row K and column K in $C_H$ corresponding to positions of the pilot signals received by the mobile terminal, and the $C_H$ is a channel correlation matrix.

Combined with the second possible implementation in the first aspect, in the case that the mobile terminal performs estimation of $\hat{H}$ for the first time, a preset initial value of the $C_H$ is used; and after $\hat{H}$ is obtained through each estimation, current $C_H$ is updated based on a calculated $\hat{H}$ and is used for calculation to perform a next estimation of $\hat{H}$, and the following updating equation is used to update the current $C_H$ based on the calculated $\hat{H}$:

$$C_H = (1-a)C_H + a\hat{H}\hat{H}^H,$$

where $\hat{H}^H$ is conjugation of $\hat{H}$, and α is a preset parameter.

In a third possible implementation in the first aspect, performing the spatial channel estimation based on the pilot signals received from the partial groups of antennas, to obtain the channel measurement result for respective antennas, includes:

wherein the pilot signals y received by a mobile terminal from the partial groups of antennas is $y=(y_1, y_2, \ldots, y_K)^T$, and pilot signals x transmitted by the partial groups of antennas at the base station side is $x=(x_1, x_2, \ldots, x_K)^T$, where K is the number of the antennas included in the partial groups of antennas;

determining a channel value $\hat{H}'$ for the K antennas in the partial groups of antennas, where $$\hat{H}' = \left(\frac{y_1}{x_1}, \frac{y_2}{x_2}, \ldots, \frac{y_K}{x_K}\right)^T;$$

performing discrete Fourier transform on $\hat{H}'$ at a point K, to obtain $h_1$;

padding (M−K) zero to an end of $h_1$ to obtain $h_2$ with M points; and performing inverse discrete Fourier transform on $h_2$, to obtain a channel estimation value $\hat{H}$ for all the antennas.

In a fourth possible implementation in the first aspect, performing the spatial channel estimation based on the pilot signals received from the partial groups of antennas, to obtain the channel measurement result for respective antennas, includes:

where the pilot signals y received by a mobile terminal from the partial groups of antennas is $y=(y_1, y_2, \ldots, y_K)^T$, and pilot signals x transmitted by the partial groups of antennas at the base station side is $x=(x_1, x_2, \ldots, x_K)^T$, where K is the number of the antennas included in the partial groups of antennas;

determining a channel value $\hat{H}'$ for the K antennas in the partial groups of antennas, where $$\hat{H}' = \left(\frac{y_1}{x_1}, \frac{y_2}{x_2}, \ldots, \frac{y_K}{x_K}\right)^T;$$

padding zero to positions in $\hat{H}'$ to an antenna which does not transmit the pilot signals to obtain a matrix $\hat{H}''$; and performing spatial filtering on the $\hat{H}''$ based on a preset spatial filter, to obtain a channel estimation value $\hat{H}$ for all the antennas.

In a second aspect, a user terminal is provided. The user terminal includes:

a pilot receiving unit, configured to receive pilot signals transmitted from different antennas in one group at a base station side in a frequency-division mode and transmitted from antennas in different groups at the base station side in a time-division mode; and a channel estimation unit, configured to perform a spatial channel estimation based on the pilot signals received from partial groups of antennas, to obtain a channel measurement result of all the antennas.

In a first possible implementation in the second aspect, the pilot signals y received by a mobile terminal from the partial groups of antennas is $y=(y_1, y_2, \ldots, y_K)^T$, and pilot signals x transmitted by the partial groups of antennas at the base station side is $x=(x_1, x_2, \ldots, x_K)^T$, where K is the number of the antennas included in the partial groups of antennas; and the channel estimation unit includes:

a minimum mean square error estimation subunit, configured to, based on an equation $\hat{H}=C'_H(C''_H+\sigma^2 \text{diag}(1/|x_1|^2, \ldots, 1/|x_K|^2))^{-1}y$, obtain a channel estimation value $\hat{H}$ for all the antennas, where $\hat{H}=(h_1, h_2, \ldots, h_M)^T$, M is the number of all the antennas, σ is noise power of a receiver in the user terminal, $C'_H$ is column K in $C_H$ corresponding to positions of the pilot signals received by the mobile terminal, $C''_H$ is row K and column K in $C_H$ corresponding to positions of the pilot signals received by the mobile terminal, and $C_H$ is a channel correlation matrix.

Combined with the first possible implementation in the second aspect, the channel estimation unit further includes:

a correlation matrix determination subunit, configured to determine the $C_H$ as a preset initial value in the case that the mobile terminal performs estimation for $\hat{H}$ for the first time; update a current $C_H$ based on a calculated $\hat{H}$ after the minimum mean square error estimation subunit obtains $\hat{H}$ through estimation each time, to make the minimum mean square error estimation subunit use the current $C_H$ to calculate for next estimation for $\hat{H}$; where the following updating equation is used to update the current $C_H$ based on the calculated $\hat{H}$:

$$C_H=(1-a)C_H+a\hat{H}\hat{H}^H,$$

where $\hat{H}^H$ is conjugation of $\hat{H}$, and α is a preset parameter.

In a second possible implementation in the second aspect, the pilot signals y received by a mobile terminal from the partial groups of antennas is $y=(y_1, y_2, \ldots, y_K)^T$, and pilot signals x transmitted by the partial groups of antennas at the base station side is $x=(x_1, x_2, \ldots, x_K)^T$, where K is the number of the antennas included in the partial groups of antennas; and the channel estimation unit includes:

a channel value determination subunit, configured to determine a channel value $\hat{H}'$ for the K antennas in the partial groups of antennas, where $$\hat{H}' = \left(\frac{y_1}{x_1}, \frac{y_2}{x_2}, \ldots, \frac{y_K}{x_K}\right)^T;$$

a Fourier transform subunit, configured to perform discrete Fourier transform on $\hat{H}'$ at a point K, to obtain $h_1$; and an inverse Fourier transform subunit, configured to pad (M−K) zero to an end of the $h_1$ to obtain a matrix $h_2$ with M points, and perform inverse discrete Fourier transform on the $h_2$, to obtain a channel estimation value $\hat{H}$ for all the antennas.

In a third possible implementation in the second aspect, the pilot signals y received by a mobile terminal from the partial groups of antennas is $y=(y_1, y_2, \ldots, y_K)^T$, and pilot signals x transmitted by the partial groups of antennas at the base station side is $x=(x_1, x_2, \ldots, x_K)^T$, where K is the number of the antennas included in the partial groups of antennas; and the channel estimation unit includes:

a channel value determination subunit, configured to determine a channel value $\hat{H}'$ for the K antennas in the partial groups of antennas, where $$\hat{H}' = \left(\frac{y_1}{x_1}, \frac{y_2}{x_2}, \ldots, \frac{y_K}{x_K}\right)^T;$$

a zero padding subunit, configured to pad zero to positions in $\hat{H}'$ to an antenna which does not transmit the pilot signals, to obtain a matrix $\hat{H}''$; and a spatial filtering subunit, configured to perform spatial filtering on $\hat{H}''$ based on a preset spatial filter, to obtain a channel estimation value $\hat{H}$ for al the antennas.

It may be learned from above technical solution that, in the present disclosure, different antennas in one group at the base station side transmit pilot signals in the frequency-division mode, and antennas in different groups transmit the pilot signals in the time-division mode, which reduces pilot overhead caused by multiple antennas; the user terminal performs the spatial channel estimation based on the pilot signals received from the partial groups of antennas, to obtain the channel measurement result for all the antennas, thus a complete channel measurement is ensured.

In addition, the user terminal performs the spatial channel estimation without waiting for reception of pilot signals from all the antennas, to reduce delay for channel parameter feedback.

DETAILED DESCRIPTION OF THE EMBODIMENTS

To make the objective, technical solution and merits of the disclosure more clearly, the disclosure is described in detail in conjunction with drawings and specific embodiments hereinafter.

Figure 1:
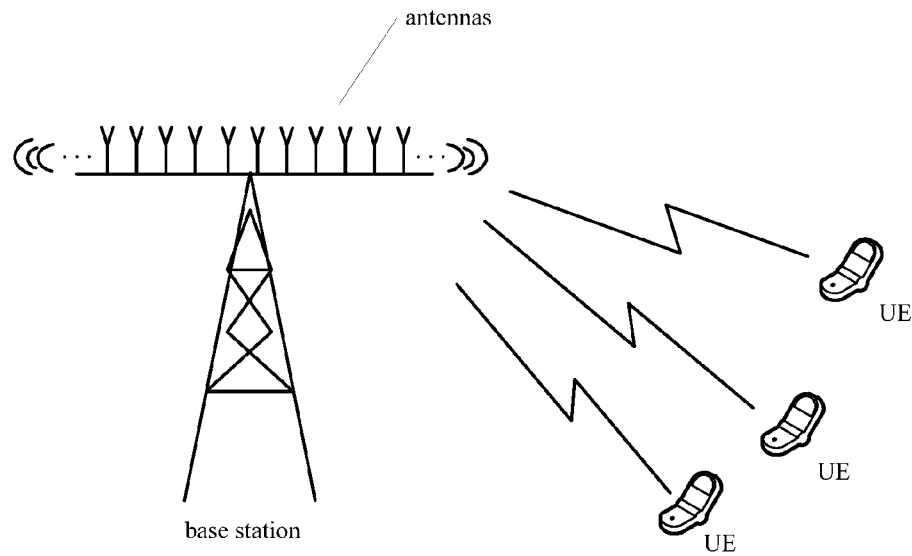
FIG. 1 is a diagram of an MIMO system with large-scale antennas provided in the conventional technology.
Figure 2:
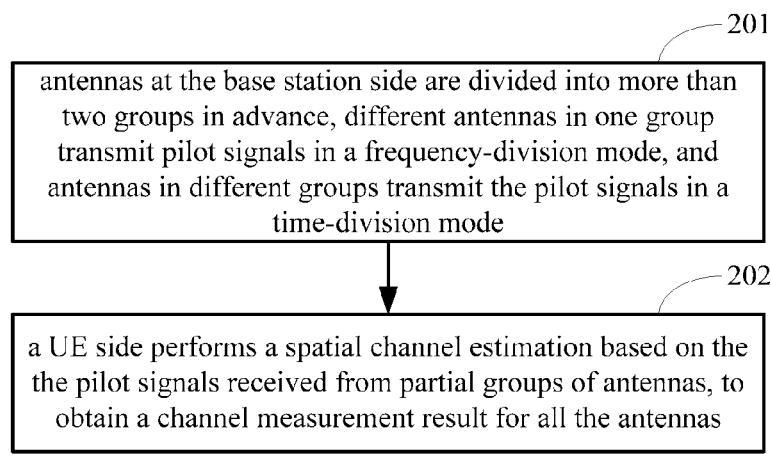
FIG. 2 is a flow chart of a method according to an embodiment of the disclosure.

The method according to the embodiments of the disclosure is shown in FIG. 2. The method mainly includes steps at two sides, i.e., steps at a base station side and steps at a terminal side.

In step 201, antennas at the base station side are divided into more than two groups in advance, the different antennas in one group transmit pilot signals in a frequency-division mode, and the antennas in different groups transmit the pilot signals in a time-division mode.

In step 202, a UE side performs a spatial channel estimation based on the pilot signals received from partial groups of the antennas, to obtain a channel measurement result for each of the antennas.

Each of the steps is described in detail in conjunction with the embodiments hereinafter. Supposing that there are M antennas at the base station side, and the antennas at the base station side are divided into N groups, where N is an integer greater than 1, each of the groups includes the K antennas, and K=M/N. To make spatial pilots even and a channel estimation error small, preferably, the antennas in groups are distributed at a regular interval.

In the step 201, the antennas in different groups transmit the pilot signals in the time-division mode. It may be set that the antennas in one group transmit the pilot signals every n sub-frames, where n is an integer greater than or equal to N, thus antennas in different groups transmit the pilot signals every n sub-frames, and pilot signals from different antennas are transmitted in different sub-frames. In the group, different antennas occupy different time-frequency resources. In addition, preferably, each of the antennas may use different time-frequency resources to transmit a pilot signal in the adopted sub-frames every time. Supposing that group 1 of the antennas transmit pilot signals at the first sub-frame, the (n+1)th sub-frame, the (2n+1)th sub-frame . . . , antenna 11 in the group 1 of antennas respectively transmits the pilot signals in the first sub-frame by using the first time-frequency resource, in the (n+1)th sub-frame by using the second time-frequency resource, and in the (2n+1)th sub-frame by using the third time-frequency resource . . . as long as there is an appointment which ensures that the time-frequency resources occupied by the antennas in one group do not conflict with each other.

Figure 3:
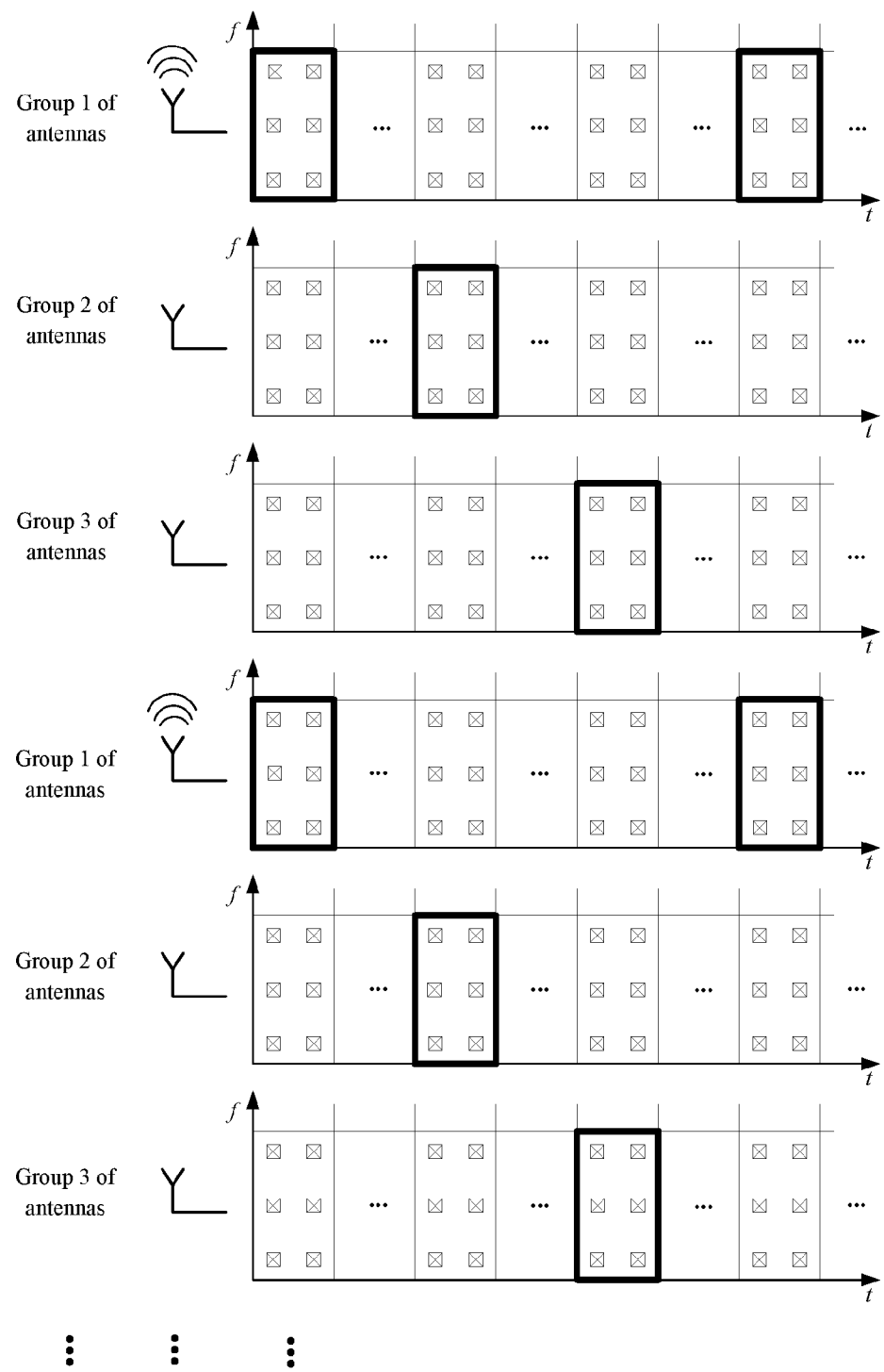
FIG. 3 is a diagram that each group antennas at a base station side transmit pilot signals according to an embodiment of the disclosure.

For example, supposing there are eighteen antennas, which are divided into three groups with six antennas each group. Each group of antennas transmit pilot signals every n sub-frames, the antennas in group 1, the antennas in group 2 and the antennas in group 3 transmit the pilot signals as shown in FIG. 3, and boxes with bold lines represent the sub-frames where the groups of antennas transmit the pilot signals.

Figure 4:
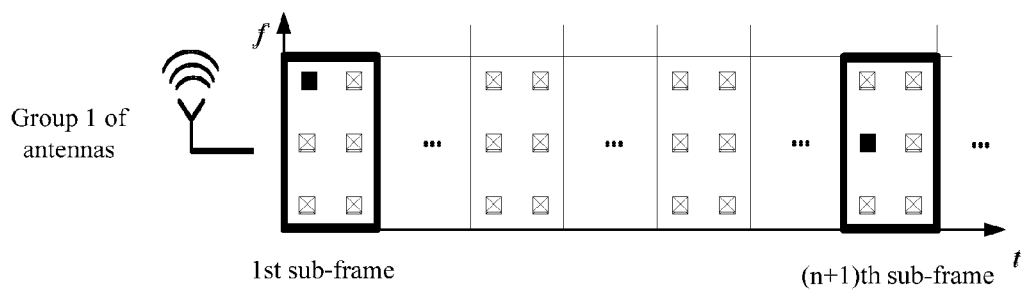
FIG. 4 is a diagram that one group of antennas transmit pilot signals according to the embodiment of the disclosure.

The antennas in the group 1 are taken as an example. The six antennas in the same group respectively transmit the pilot signals by using the time-frequency resources shown as 6 small squares in the sub-frame. As shown in FIG. 4, the solid squares in the figure represent the time-frequency resources occupied by the antenna 11, and the antenna 11 may occupy different time-frequency resources in different sub-frames. For example, in the first sub-frame, the antenna 11 occupies the time-frequency resource in the first row and first column; in the (n+1)th sub-frame, the antenna 11 occupies the time-frequency resource in the second row and first column. That is, the time-frequency resources occupied by each of the antennas in the sub-frame assigned to transmit the pilot signals are variable each time.

In the step 202, the UE side may perform the spatial channel estimation based on the pilot signals received from partial groups of antennas, to obtain the channel measurement result for each of the antennas. A case that the UE side uses the pilot signals received from the antennas in one group is taken as example, for description of the spatial channel estimation. Supposing that, in a sub-frame, K orthogonal pilots transmitted by the antennas in the group 1 are $x=(x_1, x_2, \ldots, x_K)^T$, pilot signals received by the UE from the antennas in the group 1 are $y=(y_1, y_2, \ldots, y_K)^T$, and the spatial channel estimation performed in the disclosure is to obtain a channel measurement result $\hat{H}$, where $\hat{H}$ is a channel estimation value for M antennas, $\hat{H}=(h_1, h_2, \ldots, h_K)^T$, and M may be the quantity of the antennas. The following three ways may be used for the spatial channel estimation according to the embodiments of the disclosure, but the disclosure is not limited hereto.

A first way is a spatial LMMSE (linear minimum mean square error) estimation.

The UE obtains $\hat{H}$ based on the received pilot signals y, pilot signals x transmitted by the antennas in the group 1 and a channel correlation matrix $C_H$, i.e., the UE estimates channel value of each of the antenna ports based on a correlation among the antennas. In this way, $\hat{H}$ may be calculated based on the following equation (1):

$$\hat{H} = C'_H (C''_H + \sigma^2 \mathrm{diag}(1/|x_1|^2, \ldots, 1/|x_K|^2))^{-1} y \qquad (1)$$

Where σ is noise power of a receiver at the UE side, $$C'_H = \begin{pmatrix} c_{11} & c_{1,(K+1)} & L & c_{1,M} \\ c_{21} & O & & \\ M & & O & \\ M & & & \\ c_{M,1} & & & c_{M,M} \end{pmatrix}_{M \times K},$$

i.e., in $C_H$, column K corresponding to positions of the pilot signals received by the UE is taken.

$$C_H'' = \begin{pmatrix} c_{11} & c_{1,(K+1)} & L & c_{1,M} \\ c_{(K+1),1} & O & & \\ M & & O & \\ c_{M,1} & & & c_{M,M} \end{pmatrix}_{K \times K},$$

in $C_H$, row K and column K corresponding to the positions of the pilot signals received by the UE is taken.

When the UE performs estimation of $\hat{H}$ for the first time, a preset initial value of $C_H$ is used. After $\hat{H}$ is obtained through each calculation, the current $C_H$ is updated based on the calculated $\hat{H}$ and is used for calculation to perform a next estimation of $\hat{H}$. That is, an updated $C_H$ is used for calculation each time. The following updating equation (2) is used to update the current $C_H$ based on $\hat{H}$:

$$C_H = (1-\alpha)C_H + \alpha \begin{pmatrix} O & O \\ & \hat{h}_i \hat{h}_j^* & \\ O & & O \end{pmatrix} = (1-\alpha)C_H + \alpha \hat{H}\hat{H}^H \quad (2)$$

where $\hat{H}^H$ is conjugation of $\hat{H}$, $\alpha$ is a preset parameter value, which may be set based on the demands for update accuracy and speed of the correlation matrix, and is generally set at the order of magnitude of 0.01.

A second way is a spatial DFT (discrete Fourier transform) interpolation algorithm.

At first, the channel value $\hat{H}'$ of the K antennas transmitting the pilot signals is determined based on the following equation:

$$\hat{H}' = \left(\frac{y_1}{x_1}, \frac{y_2}{x_2}, \ldots, \frac{y_K}{x_K}\right)^T$$

DFT is performed on $\hat{H}'$ at K points, to obtain $h_1$, and $h_1 = \text{DFT}\{\hat{H}'\}$.

Then, (M−K) zero is padded to an end of $h_1$ to obtain $h_2$, where the length of $h_2$ is M points, and $h_2 = (h_1, 0, \ldots, 0)$.

At last, IDFT (inverse discrete Fourier transform) is performed on $h_2$, and $\hat{H}$ is obtained, and $\hat{H} = \text{IDFT}\{h_2\}$.

A third way is spatial filtering.

At first, the channel value $\hat{H}'$ of the K antennas transmitting the pilot signals is determined based on the following equation:

$$\hat{H}' = \left(\frac{y_1}{x_1}, \frac{y_2}{x_2}, \ldots, \frac{y_K}{x_K}\right)^T.$$

Zero is padded to positions in $\hat{H}'$ corresponding to the antennas which do not transmit the pilot signals to obtain $\hat{H}''$:

$$\hat{H}'' = \left(\frac{y_1}{x_1}, 0, \ldots \frac{y_2}{x_2}, 0, \ldots, \frac{y_K}{x_K}, 0, \ldots\right)^T.$$

Spatial filtering is performed on $\hat{H}''$ based on a preset spatial filter, to obtain $\hat{H}$. The spatial filter may adopt methods such as conventional window function, and has a cut-off frequency set as $$\frac{f_s}{2}\frac{K}{M},$$

where $f_s$ is a sampling frequency of the spatial filter, i.e., a normalized cut-off frequency of the spatial filter is $$\frac{K}{M}.$$

According to the embodiment of the disclosure, the mobile terminal performs the channel estimation without waiting for reception of pilot signals from all the antennas, and may obtain the channel measurement result for the respective antennas through spatial channel estimation after receiving the pilot signals from partial groups of antennas. For example, the channel measurement result for the respective antennas may be obtained based on the pilot signals from the group of antennas after the pilot signals from one group of antennas are received. After the channel estimation result is obtained, channel parameters may be calculated and fed back, which greatly reduces feedback delay.

The above is description of the method according to the embodiment of the disclosure, and the following is description of a user terminal according to the embodiment of the disclosure.

Figure 5:
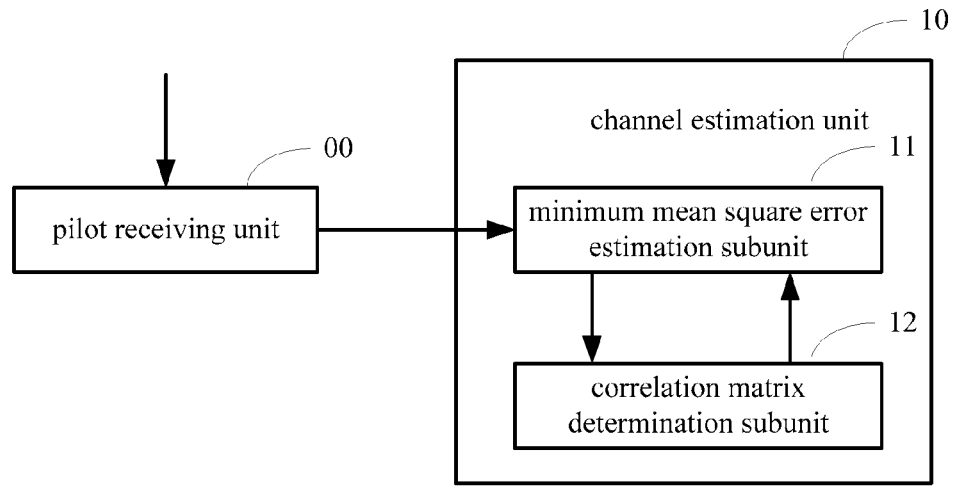
FIG. 5 is a diagram of a first structure for a user terminal according to an embodiment of the disclosure.

FIG. 5 is a diagram of structure for the user terminal according to the embodiment of the disclosure. As shown in FIG. 5, the user terminal includes a pilot receiving unit 00 and a channel estimation unit 10.

The pilot receiving unit 00 is used for receiving pilot signals transmitted by a base station side. Specifically, the base station side transmits the pilot signals in this way: antennas at the base station side are divided into more than two groups in advance, the antennas in one group transmit the pilot signals in a frequency-division mode, i.e., transmit orthogonal pilots, and the antennas in different groups transmit the pilot signals in a time-division mode.

The channel estimation unit 10 performs a spatial channel estimation based on pilot signals received from partial groups of the antennas, to obtain a channel measurement result for each of the antennas. According to the embodiment of the disclosure, the mobile terminal performs the channel estimation without waiting for reception of pilot signals from the respective antennas, and may obtain the channel measurement result for the respective antennas through spatial channel estimation after receiving the pilot signals from partial groups of antennas.

According to the embodiment of the disclosure, the channel estimation unit 10 may use multiple methods for spatial channel estimation. Corresponding to different methods, the channel estimation unit 10 may be implemented in different ways, which include but are not limited to the following.

A first implementation is shown in FIG. 5. The channel estimation unit 10 includes a minimum mean square error estimation subunit 11 which uses a spatial LMMSE (linear minimum mean square error) estimation.

It is supposed that pilot signals y received by the mobile terminal from the partial groups (supposing that there is one group of antennas, and K is the number of the antennas in the group) of antennas is $y = (y_1, y_2, \ldots, y_K)^T$, and pilot signals x transmitted by the partial groups of antennas at the base station side is $x=(x_1, x_2, \ldots, x_K)^T$, where K is the number of the antennas in the partial groups.

Based on an equation $\hat{H}=C'_H(C''_H+\sigma^2 \text{diag}(1/|x_1|^2, \ldots, 1/|x_K|^2))^{-1}y$, the minimum mean square error estimation subunit 11 may obtain channel estimation value $\hat{H}$ for respective channels, $\hat{H}=(h_1, h_2, \ldots, h_M)^T$, where M is the number of the all antennas, σ is noise power of a receiver at a UE side, $C'_H$, is column K in $C_H$ corresponding to positions of the pilot signals received by the mobile terminal, $C''_H$ is row K and column K in $C_H$ corresponding to positions of the pilot signals received by the mobile terminal, and $C_H$ is a channel correlation matrix.

Since the minimum mean square error estimation subunit 11 uses the channel correlation matrix $C_H$ when performing estimation for $\hat{H}$, there is a preferred implementation, i.e., $C_H$ may be updated iteratively based on each estimated $\hat{H}$. In this case, the channel estimation unit may further include a correlation matrix determination subunit 12.

The correlation matrix determination subunit 12 is configured to determine $C_H$ as a preset initial value in the case that the mobile terminal performs estimation for $\hat{H}$ for the first time; update a current $C_H$ based on a calculated $\hat{H}$ if after the minimum mean square error estimation subunit 11 obtains $\hat{H}$ through calculation each time, to make the minimum mean square error estimation subunit 11 use the current $C_H$ to calculate for next estimation for $\hat{H}$ The following equation is used when the current $C_H$ is updated through the calculated $\hat{H}$:

$$C_H=(1-a)C_H+a\hat{H}\hat{H}^H,$$

where $\hat{H}^H$ is conjugation of $\hat{H}$, and α is a preset parameter.

Figure 6:
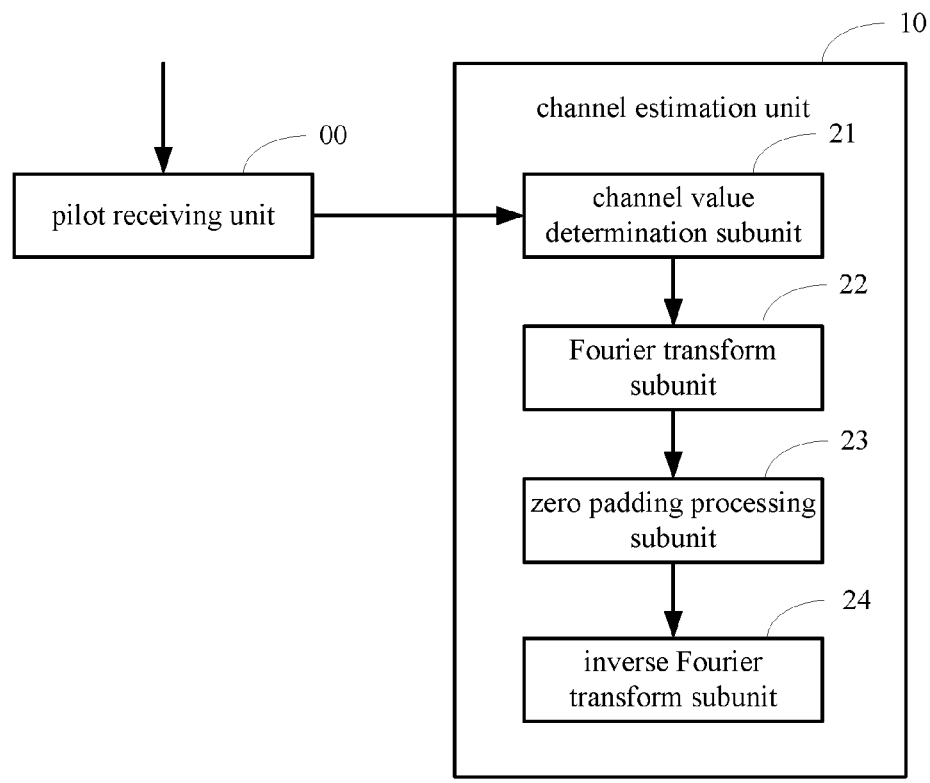
FIG. 6 is a diagram of a second structure for the user terminal according to an embodiment of the disclosure.

A second implementation is shown in FIG. 6. The channel estimation unit 10 uses a spatial DFT (discrete Fourier transform) interpolation algorithm. The channel estimation unit 10 includes a channel value determination subunit 21, a Fourier transform subunit 22, a zero padding processing subunit 23 and an inverse Fourier transform subunit 24.

It is supposed that pilot signals y received by the mobile terminal from the partial groups of antennas is $y=(y_1, y_2, \ldots, y_K)^T$, and pilot signals x transmitted by the partial groups of antennas at the base station side is $x=(x_1, x_2, \ldots, x_K)^T$, where K is the number of the antennas included in the partial groups.

At first, the channel value determination subunit 21 determines channel value $\hat{H}'$ for the K antennas in the partial groups of antennas, $$\hat{H}' = \left(\frac{y_1}{x_1}, \frac{y_2}{x_2}, \ldots, \frac{y_K}{x_K}\right)^T.$$

The Fourier transform subunit 22 performs DFT on $\hat{H}'$ at a point K, to obtain $h_1$. Then, the zero padding processing subunit 23 pads (M−K) zero to the end of the $h_1$ to obtain a matrix $h_2$ with M points. At last, the inverse Fourier transform subunit 24 performs inverse discrete Fourier transform on the $h_2$, and channel estimation value $\hat{H}$ for all the antennas are obtained.

Figure 7:
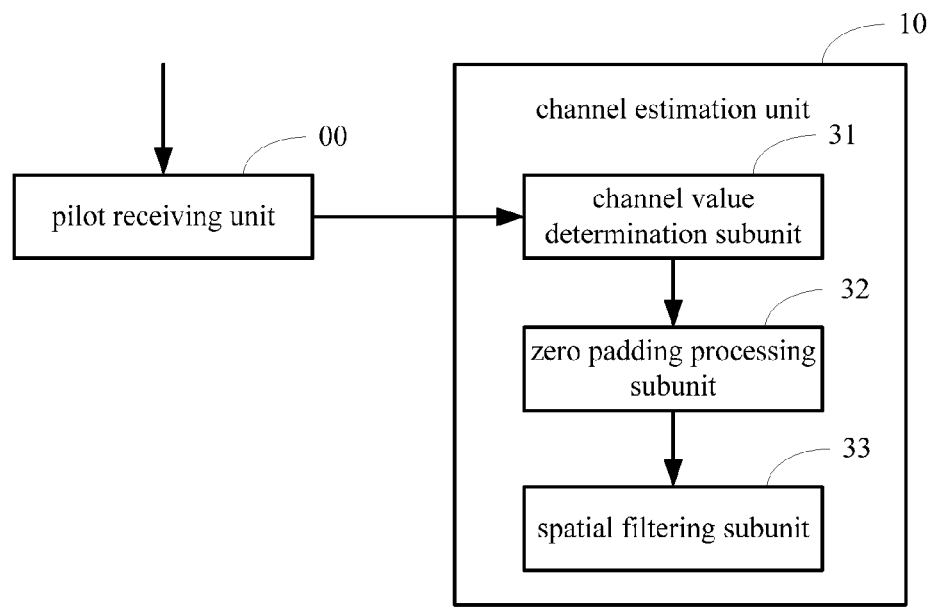
FIG. 7 is a diagram of a third structure for the user terminal according to an embodiment of the disclosure.

A third implementation is shown in FIG. 7. The channel estimation unit 10 uses spatial filtering. The channel estimation unit 10 includes a channel value determination subunit 31, a zero padding subunit 32 and a spatial filtering subunit 33.

It is supposed that pilot signals y received by the mobile terminal from the partial groups of antennas is $y=(y_1, y_2, \ldots, y_K)^T$, and pilot signals x transmitted by the partial groups of antennas at the base station side is $x=(x_1, x_2, \ldots, x_K)^T$, where K is the number of the antennas included in the partial groups.

At first, the channel value determination subunit 31 determines channel value $\hat{H}'$ for the K antennas in the partial groups of antennas, $$\hat{H}' = \left(\frac{y_1}{x_1}, \frac{y_2}{x_2}, \ldots, \frac{y_K}{x_K}\right)^T.$$

Then, the zero padding subunit 32 pads zero to positions in $\hat{H}'$ corresponding to antennas which do not transmit the pilot signals, to obtain $\hat{H}''$. At last, the spatial filtering subunit 33 performs spatial filtering on $\hat{H}''$ based on a preset spatial filter, to obtain channel estimation value $\hat{H}$ for all the antennas. The spatial filter may adopt methods such as conventional window function, and has a cut-off frequency set as $$\frac{f_s}{2}\frac{K}{M},$$

where $f_s$ is a sampling frequency of the spatial filter, i.e., a normalized cut-off frequency of the spatial filter is $$\frac{K}{M}.$$

According to the method and user terminal provided in the disclosure, pilot overhead caused by multiple antennas may be effectively reduced, and errors in channel estimation may be effectively controlled, which is verified based on a set of experimental data.

Supposing that the number M of all antennas is 600, experiments are conducted in cases that the numbers K of received orthogonal pilots are 600, 120, 60, 30, 20 and 12 respectively. Supposing that an interval in time-domain is 5 ms, proportions of time-frequency resources occupied by the orthogonal pilots are shown in Table 1.

TABLE 1

| K | 600 | 120 | 60 | 30 | 20 | 12 |
|---|---|---|---|---|---|---|
| intervals for respective antennas to transmit orthogonal pilots | 1 | 5 | 10 | 20 | 30 | 50 |
| proportions of time-frequency resources occupied by the orthogonal pilots | 71.4% | 14.3% | 7.14% | 3.6% | 2.4% | 1.4% |

It may be seen from Table 1 that, in a case that all the 600 antennas transmit orthogonal pilots, occupied time-frequency resources exceed 70%, and remaining time-frequency resources available for data transmission are less than 30%. In a case that the orthogonal pilots are transmitted by means of grouping and round-robin according to the embodiments of the disclosure, supposing that the orthogonal pilots are transmitted 60 antennas, the time-frequency resources occupied by the orthogonal pilots are only about 7%, and time-frequency resources available for data transmission are greatly improved.

Figure 8:
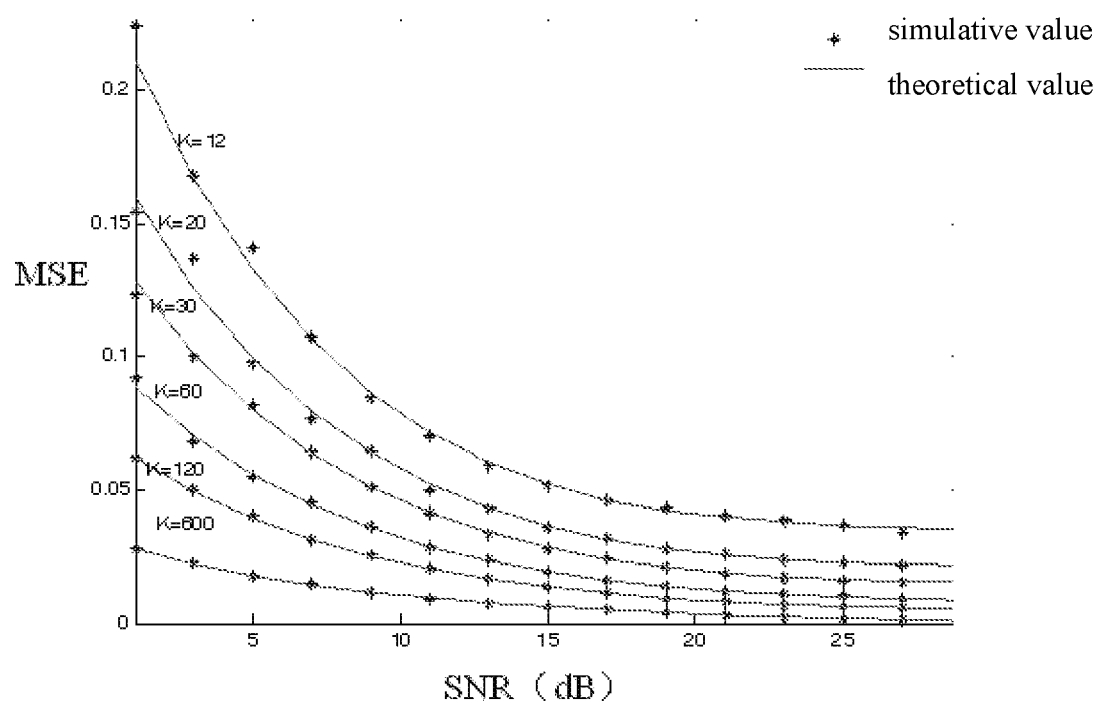
FIG. 8 is a graph that MSE varies with SNR under different values of K according to an embodiment of the disclosure.

FIG. 8 is a graph that a channel estimation error (MSE) varies with SNR (signal noise ratio) under different values of K according to an embodiment of the disclosure. It may be seen that, even if the value of K is 60, the channel estimation error is below 0.1, and the accuracy is relatively high. It may be also seen from the figure that, the more groups there are, i.e., the smaller the value of K is, and the larger the channel estimation error, thus it is required to make a tradeoff between consumption of time-frequency resources and the channel estimation error to elect the value of K.

According to the embodiments of the disclosure, it should be understood that, the described system, device and methods may be implemented in other ways. For example, the described device embodiment is merely exemplary. The division of the units is merely based on logical functions, and the units may be divided with other approaches in practice.

In addition, individual functional units according to the embodiments of the disclosure may be integrated in one processing unit, or the units may exist separately, or two or more units may be integrated in one unit. The foregoing integrated units may be realized in a form of hardware, or realized in a form of functional units with hardware and software.

The integrated unit realized in the form of software function unit may be stored in a computer readable storage medium. The software function unit is stored in a storage medium and includes some instructions for instructing a computer device (may be personal computer, server, network device, etc.) or a processor (processor) to implement part of the steps of the method according to the embodiments of the disclosure. The foregoing storage medium includes various media that can store program codes, for example, USB disk, mobile hard disk drive, read-only memory (Read-Only Memory, ROM), random access memory (Random Access Memory, RAM), magnetic disk, or optical disk and the like.

Only preferred embodiments of the disclosure are described above, which are not to limit the scope of the disclosure. Any change, substitution or modification within the spirit and principle of the disclosure fall within the protection scope of the application.

What is claimed is:

1. A channel measurement method for large-scale antennas, wherein antennas at a base station side are divided into more than two groups and the channel measurement method comprises:
   receiving, by a user terminal, pilot signals transmitted from the antennas at the base station side, wherein the antennas in one group transmit the pilot signals in a frequency-division mode, the antennas in different groups transmit the pilot signals in a time-division mode, and the antennas in different groups transmit the pilot signals in different sub-frames; and
   performing a spatial channel estimation based on the pilot signals received from partial groups of the antennas, to obtain a channel measurement result for all the antennas.

2. The channel measurement method according to claim 1, wherein time-frequency resources each time occupied by each of the antennas in a sub-frame assigned to transmit the pilot signals are variable.

3. The channel measurement method according to claim 1, wherein performing the spatial channel estimation based on the pilot signals received from the partial groups of the antennas, to obtain the channel measurement result for all the antennas, comprises:
   wherein the pilot signals Y received by the user terminal from the partial groups of the antennas is $y=(y_1, y_2, \ldots, y_K)^T$, and the pilot signals x transmitted by the partial groups of the antennas at the base station side is $x=(x_1, x_2, \ldots, x_K)^T$, wherein K is the number of the antennas comprised in the partial groups of antennas; and
   based on an equation $\hat{H}=C'_H(C''_H+\sigma^2 \mathrm{diag}(1/|x_1|^2, \ldots, 1/|x_K|^2))^{-1}y$, obtaining a channel estimation value $\hat{H}$ for all the antennas, wherein $H=(h_1, h_2, \ldots, h_M)^T$, M is the number of all the antennas, $\sigma$ is noise power of a receiver in the user terminal, $C'_H$ is column K in $C_H$ corresponding to positions of the pilot signals received by the user terminal, $C''_H$ is row K and column K in $C_H$ corresponding to positions of the pilot signals received by the user terminal, and the $C_H$ is a channel correlation matrix.

4. The method according to claim 3, wherein in the case that the user terminal performs estimation of $\hat{H}$ for the first time, a preset initial value of the $C_H$ is used; and
   after $\hat{H}$ is obtained through each estimation, current $C_H$ is updated based on a calculated $\hat{H}$ and is used for calculation to perform a next estimation of $\hat{H}$, and the following updating equation is used to update the current $C_H$ based on the calculated $\hat{H}$:
   $C_H=(1-a)C_H+a\hat{H}\hat{H}^H$, wherein $\hat{H}^H$ is a conjugate transpose of $\hat{H}$, and $\alpha$ is a preset parameter.

5. The method according to claim 1, wherein performing the spatial channel estimation based on the pilot signals received from the partial groups of the antennas, to obtain the channel measurement result for all the antennas, comprises:
   the pilot signals y received by the user terminal from the partial groups of the antennas is $y=(y_1, y_2, \ldots, y_K)^T$, and the pilot signals x transmitted by the partial groups of the antennas at the base station side is $x=(x_1, x_2, \ldots, x_K)^T$, wherein K is the number of the antennas comprised in the partial groups of the antennas;
   determining channel values $\hat{H}'$ for the K antennas in the partial groups of the antennas, wherein $$\hat{H}' = \left(\frac{y_1}{x_1}, \frac{y_2}{x_2}, \ldots, \frac{y_K}{x_K}\right)^T;$$

performing discrete Fourier transform on $\hat{H}'$ at K points, to obtain $h_1$;
   padding (M−K) zero to an end of $h_1$ to obtain $h_2$ with M points; and
   performing inverse discrete Fourier transform on $h_2$, to obtain a channel estimation value $\hat{H}$ for all the antennas.

6. The method according to claim 1, wherein performing the spatial channel estimation based on the pilot signals received from partial groups of the antennas, to obtain the channel measurement result for all the antennas, comprises:
   wherein the pilot signals y received by the user terminal from the partial groups of the antennas is $y=(y_1, y_2, \ldots, y_K)^T$, and pilot signals x transmitted by the partial groups of the antennas at the base station side is $x=(x_1, x_2, \ldots, x_K)^T$, wherein K is the number of the antennas comprised in the partial groups of the antennas;

determining channel values $\hat{H}'$ for the K antennas in the partial groups of the antennas, wherein $$\hat{H}' = \left(\frac{y_1}{x_1}, \frac{y_2}{x_2}, \ldots, \frac{y_K}{x_K}\right)^T;$$

padding zero to positions in $\hat{H}'$ corresponding to antennas which do not transmit the pilot signals to obtain a matrix $\hat{H}''$; and performing spatial filtering on the $\hat{H}''$ based on a preset spatial filter, to obtain a channel estimation value $\hat{H}$ for all the antennas.

7. A user terminal, comprising a receiver and a processor, wherein:

the receiver receives pilot signals transmitted from antennas at a base station side, wherein the antennas in one group transmit the pilot signals in a frequency-division mode, the antennas in different groups transmit the pilot signals in a time-division mode, and the antennas in different groups transmit the pilot signals in different sub-frames; and the processor performs a spatial channel estimation based on the pilot signals received from partial groups of the antennas, to obtain a channel measurement result of all the antennas.

8. The user terminal according to claim 7, wherein the pilot signals y received by the user terminal from the partial groups of the antennas is $y=(y_1, y_2, \ldots, y_K)^T$, and the pilot signals x transmitted by the partial groups of the antennas at the base station side is $x=(x_1, x_2, \ldots, x_K)^T$, wherein K is the number of the antennas comprised in the partial groups of the antennas; and the processor, based on an equation $\hat{H}=C'_H (C''_H+\sigma^2 \text{diag}(1/|x_1|^2, \ldots, 1/|x_K|^2))^{-1}y$, obtains channel estimation values $\hat{H}$ for all the channels, wherein $\hat{H}=(h_1, h_2, \ldots, h_M)^T$, M is the number of all the antennas, σ is noise power of a receiver in the user terminal, $C'_H$ is column K in $C_H$ corresponding to positions of the pilot signals received by the user terminal, $C''_H$ is row K and column K in $C_H$ corresponding to positions of the pilot signals received by the user terminal, and $C_H$ is a channel correlation matrix.

9. The user terminal according to claim 8, wherein the processor determines the $C_H$ as a preset initial value in the case that the user terminal performs estimation for $\hat{H}$ for the first time; and updates a current $C_H$ based on a calculated $\hat{H}$ after the minimum mean square error estimation subunit obtains $\hat{H}$ through calculation each time, to make the minimum mean square error estimation subunit use the current $C_H$ to calculate for next estimation for $\hat{H}$; wherein the following updating equation is used to update the current $C_H$ based on the calculated $\hat{H}$:

$C_H=(1-a)C_H+a\hat{H} \hat{H}^H$, wherein $\hat{H}^H$ is a conjugate transpose of $\hat{H}$, and α is a preset parameter.

10. The user terminal according to claim 7, wherein the pilot signals y received by the user terminal from the partial groups of the antennas is $y=(y_1, y_2, \ldots, y_K)^T$, and the pilot signals x transmitted by the partial groups of the antennas at the base station side is $x=(x_1, x_2, \ldots, x_K)^T$, wherein K is the number of the antennas comprised in the partial groups of the antennas; and the processor determines channel values $\hat{H}'$ for the K antennas in the partial groups of the antennas, $$\hat{H}' = \left(\frac{y_1}{x_1}, \frac{y_2}{x_2}, \ldots, \frac{y_K}{x_K}\right)^T;$$

performs discrete Fourier transform on $\hat{H}'$ at K points, to obtain $h_1$; and pads (M−K) zero to an end of the $h_1$ to obtain a matrix $h_2$ with M points, and perform inverse discrete Fourier transform on the $h_2$, to obtain a channel estimation value $\hat{H}$ for all the antennas.

11. The user terminal according to claim 7, wherein the pilot signals y received by the user terminal from the partial groups of the antennas is $y=(y_1, y_2, \ldots, y_K)^T$, and the pilot signals x transmitted by the partial groups of the antennas at the base station side is $x=(x_1, x_2, \ldots, x_K)^T$, wherein K is the number of the antennas comprised in the partial groups of the antennas; and the processor determines a channel value $\hat{H}'$ for the K antennas in the partial groups of the antennas, $$\hat{H}' = \left(\frac{y_1}{x_1}, \frac{y_2}{x_2}, \ldots, \frac{y_K}{x_K}\right)^T;$$

pads zero to positions in $\hat{H}'$ corresponding to antennas which do not transmit the pilot signals, to obtain a matrix $\hat{H}''$; and performs spatial filtering on $\hat{H}''$ based on a preset spatial filter, to obtain a channel estimation value $\hat{H}$ for all the antennas.

* * * * *